Patented Dec. 21, 1937

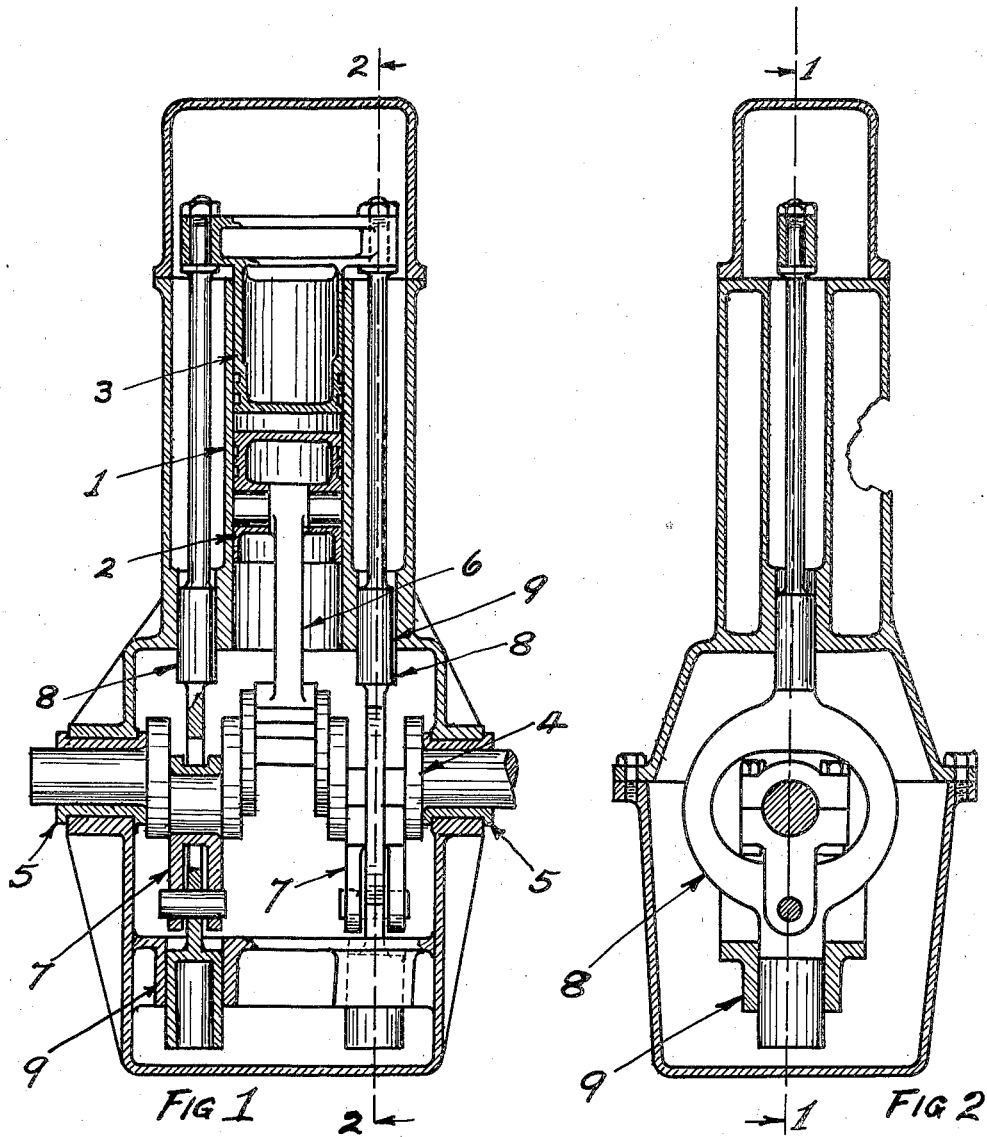

2,103,103

UNITED STATES PATENT OFFICE 2,103,103

INTERNAL COMBUSTION ENGINE

Sydney J. Waters, Santa Monica, Calif.

Application August 17, 1934, Serial No. 740,254

5 Claims. (Cl. 123—51)

This invention relates to improvements in opposed piston internal combustion engines and refers more particularly to an improved connection between the crank shaft and the outer piston designed to produce improved balance of inertia forces exerted by the reciprocating masses so as to effectively reduce vibration and permit of high operating speeds. The conventional double piston in line or V type engine is not accurately balanced so far as the reciprocating masses are concerned due to the angularity of their connecting rods which produces forces of different magnitude at each end of the piston's stroke, that is, the inertia force of the one piston when at the end of its in or compression stroke is greater than the inertia force of the other piston when at the end of its in or compression stroke causing the engine to vibrate. In order to overcome this defect I have invented a new type of connection between the outer piston and the crankshaft which affords accurate balancing of the inertia forces of the pairs of oppositely moving pistons and their respective rods and connections. The invention consists of certain novel features of construction, combination and arrangement of the elements shown in the drawing and hereinafter described in detail and particularly set forth in the appended claims.

In the drawing:

Figure 1 is a longitudinal view of a single cylinder engine.

Figure 2 is a vertical cross section on the line 2—2 of Figure 1.

Like characters of reference refer to similar parts throughout the views of the drawing. As shown in the drawing, 1 designates the cylinder of the engine in which two pistons, 2 the inner piston and 3 the outer piston reciprocate in opposite directions: 4 the crankshaft mounted in suitable bearings 5, 5 of the engine frame and provided with a flywheel: 6 a connecting rod directly connecting the inner piston with the center throw of the crankshaft: 7, 7, outer connecting links operatively connecting the outer piston to the two outer throws of the crankshaft through the means of rigid reciprocating pitman arms 8, 8, which are slidably supported in the guides 9, 9. The present invention is involved primarily in the connection between the outer piston and the outer throws of the crankshaft 4. Said connection embraces projections to the outer piston at the outer end of cylinder and extending beyond the opposite sides thereof in a direction parallel to the axis of the crankshaft to which are attached the outer ends of long pitman arms which arms extend to the side of the crankshaft remote from the cylinder and to which are pivotally attached the small ends of connecting links 7, 7, the big ends of which are rotatably connected to the outer throws of the crankshaft. It will be noted that in passing the crankshaft, the pitman arms are made with large holes forming yokes and annuli to allow the crankshaft to pass through and to allow a working clearance for the outer crankpins and connecting rod ends. I do not however confine myself to this construction. The pitman arms may have one side open instead of completely encircling the crankshaft which construction facilitates assembling and is also desirable when it is preferred to offset the cylinder in relation to the axis of the crankshaft. The result of this construction is to procure accurate balancing of inertia forces due to the reciprocating masses of the inner and outer pistons and their connections respectively. In carrying out this construction and in order to achieve accurate balance it is essential that the length of the throws of the crankshaft should be inversely proportional to the weight of their respective attached reciprocating parts. Also it is desirable that all the connecting rods and the crank throw length ratios be equal in order to obtain accurate balance of the reciprocating masses. The illustrations in the accompanying drawing are of a single cylinder engine but I do not limit myself to the form disclosed since the features of the invention may be adapted to multicylinder in line engines or adjacently placed pairs of cylinders.

I claim:—

1. An opposed piston internal combustion engine comprising a cylinder open at its ends, a pair of oppositely reciprocating pistons therein, a multithrow crankshaft, a connecting rod directly connecting the inner piston with the center throw of the said crankshaft, outer connecting links having their small ends lying on the side of the crankshaft remote from the cylinder and opposite in direction to the center connecting rod and connected to the outer and opposite throws of the said crankshaft, pitman arms reciprocally guided on opposite sides of the cylinder and parallel thereto, the outer end of said pitman arms detachably connected to projections integral with the outer piston, the other end of the said pitman arms connected to the small ends of the before mentioned side connecting links on that side of the crankshaft remote from the cylinder.

2. An opposed piston internal combustion engine comprising a cylinder open at its ends, a pair of oppositely reciprocating pistons therein, a crankshaft, a connection between the inner piston and the crankshaft, connections between the outer piston and the crankshaft comprising pitman arms reciprocably mounted alongside and parallel to the cylinder, the outer end of said pitman arms detachably connected to side projections on the outer piston, the other end of said arms connected to connecting links on the outer throws of the crankshaft and lying on the side of the crankshaft farthest away from the cylinder, the relative throws of said crankshaft being substantially in inverse proportion to the weight of the respective reciprocating parts attached thereto.

3. An opposed piston internal combustion engine comprising a cylinder, a pair of oppositely reciprocating pistons therein, a crankshaft, a connection between the inner piston and said crankshaft, said crankshaft being provided with two crankpins for operating the outer piston, and operative connections between said latter crank pins and the outer piston, consisting of connecting links extending diametrically opposite the connecting rod of the inner piston and means for operatively connecting the small ends of said links with the outer piston.

4. An opposed piston internal combustion engine comprising a crankcase, a cylinder open at its ends arranged upon the crankcase, a multiple throw crankshaft rotatably mounted on suitable bearings within the crankcase, other bearings or guides within the said crankcase positioned on that side of the crankshaft opposite the cylinder, a pair of oppositely reciprocating pistons within the cylinder, a connection directly connecting the inner piston with the crankshaft, yokes or annuli surrounding the crankshaft and having diametrically disposed extensions and mounted at opposite sides and parallel to the axis of the cylinder, the outer extension of said yokes or annuli connected to the outer piston, and the inner extension of said yokes or annuli reciprocally mounted on the guides within the crankcase, connecting links mounted on the outer throws of the crankshaft and pivotally connected to the inner extension of the yokes or annuli whereby the angularity effect of the connecting rods on the travel of the pistons is the same.

5. An opposed piston internal combustion engine comprising a cylinder open at its ends, a pair of oppositely reciprocating pistons therein, a crankshaft, a connecting rod directly connecting the inner piston with said crankshaft, outer connecting links lying on the side of the crankshaft remote from the cylinder connecting other crank throws of the said crankshaft with pitman arms reciprocably guided on opposite sides of the cylinder and parallel thereto, means to detachably connect the outer ends of said pitman arms to the outer piston, the other ends of said pitman arms extending around the axis of the crankshaft and pivotally connected to the small ends of the before mentioned connecting links on the side of the crankshaft remote from the cylinder.

SYDNEY J. WATERS.